United States Patent [19]

Steffek et al.

[11] Patent Number: 5,784,268

[45] Date of Patent: Jul. 21, 1998

[54] INVERTER CONTROL FOR SUPPORT OF POWER FACTOR CORRECTED LOADS

[75] Inventors: Laura M. Steffek, Wisconsin Rapids; Chris Egstad, Tomah; Kevin R. Mengelt, Sun Prairie, all of Wis.

[73] Assignee: General Signal Corporation, Stamford, Conn.

[21] Appl. No.: 710,656

[22] Filed: Sep. 20, 1996

[51] Int. Cl.$^6$ .................................................. H02H 7/122
[52] U.S. Cl. .................. 363/55; 363/41; 307/46; 307/66; 361/111; 361/92; 361/93
[58] Field of Search .................. 307/43, 41, 66, 307/64, 85, 86, 87, 81, 55, 46; 363/23, 56, 55, 41, 97, 133; 361/88, 89, 92, 93, 111

[56] References Cited

U.S. PATENT DOCUMENTS

| | | | |
|---|---|---|---|
| 4,031,463 | 6/1977 | Norberg | 324/76.16 |
| 4,277,692 | 7/1981 | Small | 307/66 |
| 4,366,389 | 12/1982 | Hussey | 307/66 |
| 4,400,624 | 8/1983 | Ebert, Jr. | 307/43 |
| 4,473,756 | 9/1984 | Brigden et al. | 307/66 |
| 4,516,035 | 5/1985 | Rhoads et al. | 307/66 |
| 4,692,854 | 9/1987 | Baxter, Jr. et al. | 363/75 |
| 4,694,402 | 9/1987 | McEachern et al. | 364/487 |
| 4,713,553 | 12/1987 | Townsend et al. | 307/64 |
| 4,763,014 | 8/1988 | Model et al. | 307/66 |
| 4,797,936 | 1/1989 | Nakatsugawa et al. | 382/34 |
| 4,814,934 | 3/1989 | Jones et al. | 361/88 |
| 4,890,005 | 12/1989 | Schornack | 307/87 |
| 4,956,563 | 9/1990 | Schornack | 307/66 |
| 5,055,703 | 10/1991 | Schornack | 307/64 |
| 5,229,651 | 7/1993 | Baxter, Jr. et al. | 307/66 |
| 5,315,533 | 5/1994 | Stich et al. | 307/66 |
| 5,426,579 | 6/1995 | Paul et al. | 363/126 |
| 5,473,533 | 12/1995 | Mengelt | 307/66 |
| 5,576,941 | 11/1996 | Nguyen et al. | 363/21 |
| 5,579,197 | 11/1996 | Mengelt et al. | 361/93 |

OTHER PUBLICATIONS

Best Power Technology, Inc., Patriot User Guide, No. LTS-0379F, 1994, pp. 1-10.
Best Power Technology, Inc., Patriot pulse with calculation algorithm software program listing, 1995.

*Primary Examiner*—Peter S. Wong
*Assistant Examiner*—Shawn Riley
*Attorney, Agent, or Firm*—Foley & Lardner

[57] ABSTRACT

A method for controlling an inverter to improve the ability of the inverter to support power factor corrected (PFC) loads under transient conditions is provided. Changes in the load being provided power by an inverter may cause the RMS output voltage level of the inverter to drop. A PFC load may respond to such drops in the applied voltage level by increasing its current demand. This may cause the inverter current limit to be reached, forcing the inverter to be turned off, and causing the load to be dropped. This problem is avoided by responding to such load changes by immediately increasing the RMS output voltage level of the inverter to a level sufficient to minimize the voltage drop and prevent excessive current demands from the PFC load. The output voltage level of the inverter is then gradually reduced from the high voltage level to prevent the occurrence of oscillations due to interactions between the PFC load and the inverter controller. The present invention may be applied to backup power systems employing square wave inverters. In response to load changes, or transitions between line power and inverter operation following the detection of a line power fault, the inverter pulse width is immediately increased to an approximately maximum pulse width. The pulse width is then gradually reduced in increments to the pulse width required to maintain a constant regulated output RMS voltage level on the inverter under steady state conditions.

35 Claims, 4 Drawing Sheets

INVERTER CONTROL FOR SUPPORT OF POWER FACTOR CORRECTED LOADS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of electrical power systems, and more specifically to electrical power conversion systems, such as backup power supplies or systems, that include inverters for providing power to one or more loads having power factor corrected power supplies.

BACKGROUND OF THE INVENTION

Electrical power conversion systems are used to provide electrical power to one or more loads at a desired frequency and voltage and/or current level. These systems typically employ an inverter to convert electrical power at one frequency and voltage and/or current level to the desired frequency and voltage and/or current level to be provided to the load. Inverters include controllable switching devices, such as transistors, that are controlled to operate in a defined switching sequence to convert the electrical power provided on input lines to output power provided on output lines of the inverter to provide power to a load. The switching sequence in which the inverter switching devices are operated defines the frequency and voltage and/or current amplitude characteristics of the electrical power provided to the load by the inverter. Various inverter topologies, and switching schemes therefore, have been designed to provide AC-to-AC or DC-to-AC power conversion.

An example of a power conversion system that employs an inverter to provide power to a load is an uninterruptible power supply or system. Uninterruptible power supplies or systems, commonly referred to as UPS, are used to provide backup power to critical loads such as computer systems, industrial microprocessor control systems, and the like, where a loss of line power can result in an interruption of programs and the loss of valuable data or a system malfunction. A UPS may also provide a line power conditioning function to ensure that transient spikes, low voltage conditions, or distorted power waveforms on an AC power system do not disturb the operation of the computer or other system which is supplied with power through the UPS. Typically, the UPS includes a battery which is interfaced through the inverter to an AC output line.

Various designs for backup or uninterruptible power systems have been developed. Generally, it is desirable that the power supplied to the critical load from the backup power system should be without a substantial break or discontinuity of power flow despite breaks in the main AC power system power. Systems which can provide power without observable breaks or discontinuities in the waveform of the voltage supplied to the critical load despite loss or disruptions of the AC input power are often complex and relatively expensive. However, lower cost backup power systems have been introduced which are intended for use with individual desktop computer systems rather than larger (and more expensive) computers or local area networks. These less expensive types of backup power systems commonly use a mechanical relay as the means by which power is transferred from the AC power system to the battery powered inverter. As a consequence, the power transfer is relatively slow, resulting in a brief break in the power and a drop in the voltage supplied to the critical load. Such systems are sometimes referred to as standby power supplies or SPS in distinction from true uninterruptible power supplies in which there is no significant break in the output voltage waveform.

A brief loss of power or voltage drop can be tolerated by some loads which have the capability of riding through the power loss, for example, conventional incandescent lamps or motors. Some types of electronic equipment have a power supply with a relatively large input power supply filter which has sufficient stored energy to supply the consuming load during the time required to transfer power from the power system to the inverter and vice versa. There are also many types of critical loads for which a break in the input voltage waveform of as short as 2 milliseconds can cause the load to fail. For example, high intensity discharge lights such as those used in many hospital operating rooms may extinguish upon loss of power for a relatively short period of time, in the range of a few milliseconds, and may require a significant period of time, e.g., several minutes, before they can be restarted.

Another type of load that can be adversely affected by even a brief interruption or reduction in the voltage that is provided to the load, is a load that includes a power factor corrected (PFC) power supply. Modern computers and other types of electrical equipment often include PFC power supply circuits, which are designed to improve the power factor which is presented to the AC power line. Such PFC power supplies typically produce an input current waveform which tracks the shape and phase of the AC input voltage, to provide a corrected power factor that approaches unity. In certain cases, the break in the input voltage signal provided to a PFC load can cause instabilities and oscillations in the PFC power supply, and may result in a consequent failure of the computer or other system receiving power from the power supply.

Consider, for example, the case of a PFC load that is provided with power by a backup power system. When the backup power system transfers from line mode operation to inverter operation there may be a brief interruption or reduction in the voltage that is provided by the system to the PFC load. In response to this loss of voltage, the PFC supply in the load draws more current from the backup power system inverter than it does under normal steady state operating conditions. This increase in current demand loads the backup power system sufficiently to cause a reduction in its output voltage. As the PFC load gradually reduces its current demand, the inverter output voltage gradually increases in response. This reduction in output current and increase in output voltage continues until steady state operation is reached. Most backup power systems, however, have a current conduction limit. This is a self-protection mode of operation of the system in which, in response to high current demands from the load, the system inverter is shut off temporarily to protect the system, including the inverter switching devices, from damage. Sometimes, immediately after the transfer from line to inverter operation, a PFC load may demand so much current that the backup power system is forced into this self-protection conduction limit mode. When the backup power system is in conduction limit mode, with the inverter turned off, no energy is delivered to the load. Once the inverter is reactivated, and the output voltage is restored, the PFC load, which was starved of energy during the conduction limit period, again demands a large amount of current. Thus, once again, the inverter could be forced to turn off to protect the backup power system circuitry. It is possible under these conditions that the backup power system will be forced into conduction limit mode for so long a period that the PFC load is starved of energy sufficiently to cause the load to shut down. This is known as a load drop.

A related problem may occur if there is a change in the load being supported by the backup power system. Such a problem may occur, for example, when the backup power system inverter is supporting one PFC load, such as a computer, and another load is added, such as when another computer provided with power from the inverter is turned on. The load that is added may initially require a large amount of current to power up. This increased current demand may cause the output voltage level provided by the inverter to drop. In response to this voltage drop, the original PFC load may itself demand more current from the backup power system. The combined current demands of the original and additional load may cause the backup power system to go into conduction limit mode, temporarily shutting off the inverter. Thus, it is possible that turning on an additional load may cause the pre-existing load to be dropped, as no energy is provided to either load when the backup power system is in conduction limit mode. This problem is not limited to PFC loads being supplied with power by an inverter in a backup power system. Load drops may occur whenever an additional load is placed on an inverter that is supplying power to a PFC load, thereby causing the output voltage of the inverter to drop, and the PFC load connected to the inverter to increase its current demand.

A similar problem may occur when powering up a single PFC load that is provided with power from an inverter. When a PFC load is initially turned on, it draws a large amount of current. This, in turn, causes the inverter output voltage to drop. Many PFC power supplies have a "power good" circuit which monitors the input voltage applied to the power supply. If the voltage falls below a minimum level, the PFC power supply may decide that the incoming voltage is "bad", and thus will not operate. Thus, the voltage drop caused by initially powering up a PFC load may cause the PFC supply to shut down.

One way to increase the PFC load compatibility of an inverter is to minimize the drop in the output voltage caused by increased current demands. This may be accomplished by reducing the impedance of the inverter circuit. Impedance may be reduced by using inverter switching devices having less voltage drop across the device at a given current level. For example, MOSFETs having a lower drain-to-source resistance when turned on may be used. For backup power system applications, a larger battery (i.e., one with a higher capacity) will have less impedance than a smaller one. Larger gauge wires may be used in the connections between the inverter and the battery and between the inverter and the power system output. Large DC electrolytic capacitors might be used in parallel with the power system battery to reduce the effective impedance of this DC voltage source. In many cases, the inverter output is coupled to the load through a transformer. Larger wire gauges may be used in the transformer to reduce the transformer impedance. A major disadvantage associated with reducing the impedance of a power conversion system is increased cost. Lower impedance components are more expensive than similar components having higher impedance. In addition, increasing the battery capacity or adding large storage capacitors will increase the physical size and weight of a backup power system. This is contrary to the trend in such systems, which is towards smaller footprints and lower weights.

Another way to increase the PFC load compatibility of an inverter is to keep the RMS output voltage of the inverter at a high level. For example, prior art backup power systems employing square wave inverters have provided increased RMS output voltage levels by using a consistently wide inverter pulse width. In such prior art systems, the inverter pulse width is not varied to provide output voltage regulation, but is kept at or near the maximum pulse width all of the time that the inverter is in operation. However, keeping the pulse width at the maximum all of the time may cause problems with some loads. For example, a load that includes a transformer would not be compatible with this type of inverter waveform because the transformer would saturate. Operating in saturation could eventually cause a transformer to overheat and fail.

Increased PFC load compatibility may not be achieved by conventional methods for regulating the output voltage of an inverter to a constant level. Such conventional methods often result in instability. A PFC load is an active load. It quickly responds to reductions in its input voltage by increasing its current demand, and it responds to increases in its input voltage by decreasing its current demands. Consider a square wave inverter supporting such a load under transient conditions, such as following the addition of a load to the system. Conventional voltage regulation schemes will respond with a rapid increase in the pulse width following a voltage drop in the inverter output. This will cause the PFC load to reduce its current demand, and the inverter output voltage will quickly rise. In response, the conventional voltage regulator will quickly reduce the inverter pulse width, causing the inverter output voltage to drop. This response could initiate an oscillatory pattern, with the inverter alternately increasing and decreasing its pulse width dramatically, resulting in an undesirable instable output voltage level.

SUMMARY OF THE INVENTION

The present invention provides a method for improving the ability of an inverter to support a power factor corrected (PFC) power supply. The inverter may, but need not necessarily, be part of an uninterruptible or standby backup power system (UPS or SPS). In accordance with the present invention, an inverter is controlled to provide a desired regulated RMS output voltage level to a PFC load under steady state operating conditions. Under transient conditions, such as due to a transfer from line to inverter power in a backup power system, or a surge load condition caused by the powering of a load, the inverter is controlled rapidly to output a high voltage level to minimize any drop in the output voltage level of the inverter. This prevents load drops at the time of transfer from line to inverter power or under other transient conditions. After responding to the transient condition by rapidly increasing the output voltage level of the inverter, the inverter is controlled to gradually reduce the output voltage to the desired steady state voltage level. This gradual reduction prevents oscillations in the output voltage level. The inverter is then controlled to provide the desired regulated RMS output voltage level to the load in the same manner as before the transient condition occurred.

The present invention is applicable to any power conversion system including an inverter for providing power to a PFC load. The output voltage or current level provided by the inverter is determined. When a sudden and significant drop in the output voltage level or rise in the current level of the inverter is detected, a transient condition is indicated. In response to the indication of a transient condition, the inverter is controlled to increase the RMS output voltage level of the inverter to a level sufficient to minimize the drop in the output voltage level to prevent high current demands of the PFC load from causing a load drop. This voltage level may preferably be higher than that required to maintain the desired RMS output voltage level under steady state conditions. The RMS output voltage level of the inverter is then gradually reduced to the desired RMS voltage level at steady state to prevent oscillations in the output voltage level.

For inverter applications in general, transient conditions may occur when a PFC load provided power from the inverter is started up, and when additional loads are added to an inverter which is already supplying power to one or more PFC loads. For backup power system applications in particular, a transient condition may also occur following the transition from AC line power to battery power if there is a break in the power supplied to the load. For such backup power system applications, therefore, the inverter may be controlled to automatically provide an output voltage level greater than the desired steady state voltage level upon transition from line to inverter power. The backup power system inverter is then controlled to gradually reduce the output voltage level to the desired RMS output voltage at steady state.

The present invention may be applied to power conversion systems employing inverters of various designs and employing various control schemes. Thus, the present invention may be applied to AC-to-AC and DC-to-AC inverter systems employing various inverter switching and modulation schemes, including square wave inverters, pulse width modulation (PWM) inverters, etc. For square wave inverters, the RMS output voltage level is related to the inverter pulse width. In accordance with the present invention, a transient condition may be indicated whenever a rapid increase in the inverter pulse width is required to maintain the steady state RMS output voltage level. Under such conditions, instead of attempting to regulate the output voltage level at the steady state level, the pulse width is automatically increased to approximately the maximum pulse width. Thus, in response to a transient condition resulting in a drop in the RMS output voltage level, the inverter is controlled to provide the maximum RMS output voltage level. The pulse width is then gradually reduced until the output voltage is reduced to the desired steady state RMS output voltage level. For square wave inverters employed in backup power systems, the inverter pulse width is also automatically set to approximately the maximum pulse width upon transition from line to inverter power. The pulse width is then gradually reduced until the output voltage is reduced to the desired steady state RMS voltage level.

The present invention provides a low cost way of increasing the ability of inverters to support PFC loads. The present invention does not require costly modifications to the inverter circuit itself. The present invention instead relies on controlling the inverter to provide increased output voltage levels in response to transient conditions which cause the output voltage level of the inverter to drop, and gradually reducing the output voltage level to prevent oscillations. The inverter control scheme of the present invention may be implemented in hardware, software, or a combination thereof. The present invention may also be incorporated into otherwise conventional power conversion systems, including backup power systems, having microprocessor based inverter controllers by modifying the inverter control software to thereby implement the invention.

Further objects, features and advantages of the invention will be apparent from the following detailed description when taken in conjunction with the accompanying drawings.

DETAILED DESCRIPTION OF THE INVENTION

Figure 1:
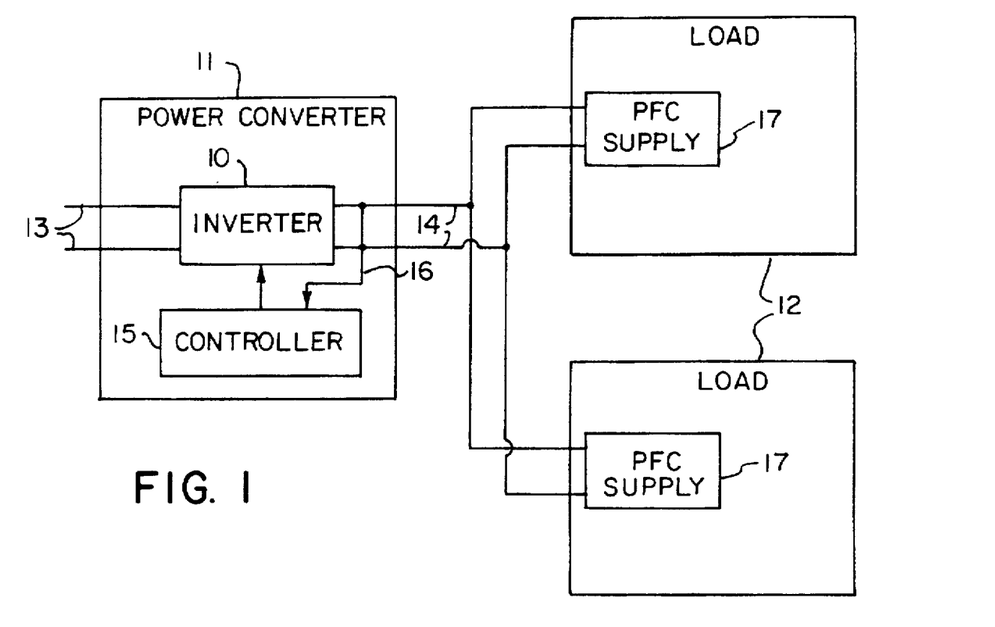
FIG. 1 is a simplified block diagram of a power conversion system including an inverter for providing power to one or more power factor corrected loads and incorporating the present invention.

The present invention provides a low cost way for increasing the ability of an inverter to support power factor corrected (PFC) loads. As illustrated in FIG. 1, an inverter 10 is typically part of a power conversion system 11 for providing electrical power to one or more loads 12. Input power is provided to the inverter 10 on input lines 13 and output power is provided from the inverter 10 to the loads 12 on output lines 14. The inverter 10 includes switching devices, such as transistors, that are switched in a controlled sequence by an inverter controller 15 to provide output power on the output lines 14 at a desired frequency and voltage and/or current level from the input power provided on the input lines 13, which may be at a different frequency and/or voltage and/or current level. For example, for a backup power system power converter, DC input power is provided from a battery to the input lines 13 of the inverter 10, and the inverter 10 is controlled by the controller 15 to provide an AC signal at a desired RMS voltage level on the output lines 14. The controller 15 is typically able to regulate the output voltage level of the inverter 10 to a desired level by determining the actual voltage level provided by the inverter 10 using feedback lines 16, and adjusting the inverter output until the voltage level on the lines 16 equals the desired voltage level. The controller 15 is also capable of turning off the inverter 10 to protect the power converter 11 if a current limit is reached.

The loads 12 include power factor corrected (PFC) power supply circuits 17, which provide power to the loads 12 and which receive power from the output lines 14 of the inverter 10. The PFC power supplies 17 are designed to improve the power factor which is presented to AC power lines which provide power to the loads 12. Such PFC power supplies 17 typically produce an input current waveform which tracks the shape and phase of the AC input voltage, to provide a corrected power factor that approaches unity. As described previously, the PFC supplies 17 typically respond to a drop in the voltage level supplied by the inverter 10 on the lines 14 by increasing the current demand of the loads 12. This, in turn, may cause the output voltage of the inverter 10 to drop even furthers If the current demand of the loads 12 exceeds the conduction limit of the inverter 10, the controller will shut down the inverter 10 to protect the power converter 11, and thereby deprive the loads 12 of power completely. Transient conditions that may cause a sudden drop in the output voltage of the inverter 10 include the initial turn on and powering up of one of the PFC loads 12, or the connection of additional loads 12 to the inverter 10.

Under steady state operating conditions, the inverter 10 is controlled in a conventional manner by the controller 15 to maintain a regulated output voltage level on the inverter output lines 14. The desired RMS output voltage level provided by the inverter is a constant quantity, preferably not varying under normal operating conditions. Under transient conditions, when a change in the load connected to the output lines 14 of the inverter 10 causes the output voltage level to drop rapidly, the controller 15 responds by immediately controlling the inverter 10 to increase the RMS output voltage level provided on the output lines 14. The inverter 10 is controlled to increase the RMS output voltage to a level sufficient to minimize rapidly the voltage level drop on the output lines 14. Increased current demand from the PFC loads 12 is thereby prevented, and load drops due to the power conversion system 11 entering conduction limit are avoided.

The minimum output voltage level which the inverter 10 must quickly provide upon the determination of a transient condition will depend upon the electrical characteristics of the inverter 10 and any PFC loads that are being provided power by the inverter 10, the nature of the load change which is causing the voltage drop, and the conduction limit. Thus, a minimum RMS output voltage level that must be provided by the inverter 10 in response to a transient condition causing a drop in the output voltage level may be calculated or estimated based on prior knowledge of the inverter and existing and expected loads and/or characteristics of the voltage and/or current waveforms on the output lines 14 during such transient conditions. However, it is preferred that, instead of performing such complex calculations, the RMS output voltage level of the inverter 10 be increased immediately following the determination of a transient condition causing a drop in the inverter output voltage to the maximum RMS output voltage capable of being provided by the inverter 10. This will ensure, in most cases, that the inverter output voltage is raised quickly to a level sufficient to minimize the output voltage drop and prevent increased current demands causing load drops.

It should be understood that, as used in this description and the appended claims, the term "maximum output voltage level" also includes voltage levels which are approximately maximum. Moreover, it is noted that the absolute maximum voltage level that an inverter is capable of providing depends on the nature of the load it is supporting. In this context, however, the maximum output voltage level being referred to is the maximum voltage level that the inverter can provide under the load conditions existing at the time. Also, it is generally preferable that the inverter output be raised to the maximum voltage level by controlling the inverter switching devices in a conventional manner to increase the voltage level. The use of auxiliary circuitry to increase the output voltage level of the inverter, such as the use of boost circuits that increase the output voltage by effectively changing the turns ratio of an inverter output transformer, is not preferred. Increasing the turns ratio of the transformer actually increases the likelihood that the inverter will be forced into conduction limit mode.

After the RMS output voltage level of the inverter 10 is raised quickly to a high voltage level, such as approximately the maximum RMS output voltage level of the inverter 10, the RMS output voltage level of the inverter 10 is gradually reduced to the desired RMS output voltage level under steady state conditions. This gradual reduction prevents oscillations in the output voltage level due to feedback between the inverter 10 and the PFC supplies 17. This gradual reduction will typically be accomplished in a stepwise fashion, although the reduction may also be a gradual continuous reduction in the RMS output voltage level of the inverter, depending upon the type of inverter 10 which is being controlled. Once the output voltage level of the inverter 10 is reduced from a high voltage level to the desired steady state RMS output voltage level, the inverter may once again be controlled in a conventional manner to maintain the desired regulated steady state output voltage level.

The actual control mechanisms that may be used to rapidly increase and gradually decrease the output voltage level of the inverter 10 will depend upon the type of inverter and the control or modulation scheme employed. Such control mechanisms will be well known to those skilled in the art. Also, the mechanism used to determine the occurrence of a transient condition may include conventional methods for detecting a voltage drop (or current rise) in the inverter output. Alternatively, a transient condition may be assumed whenever the controller 15 is required to adjust the inverter output to maintain the steady state output voltage level by an amount which is more than that typically required under normal steady state conditions.

Having described the invention in general terms, a detailed description of a preferred embodiment of the present invention will now be presented. In this exemplary embodiment, the present invention is provided to control a stepped square wave inverter in a backup power system, to enhance the ability of the backup power system to support PFC loads. The following detailed description of an exemplary embodiment of the present invention should in no way be interpreted as a limitation of the invention to the particular application described or, in general, as a limitation of the present invention to backup power system or square wave inverter applications.

Figure 2:
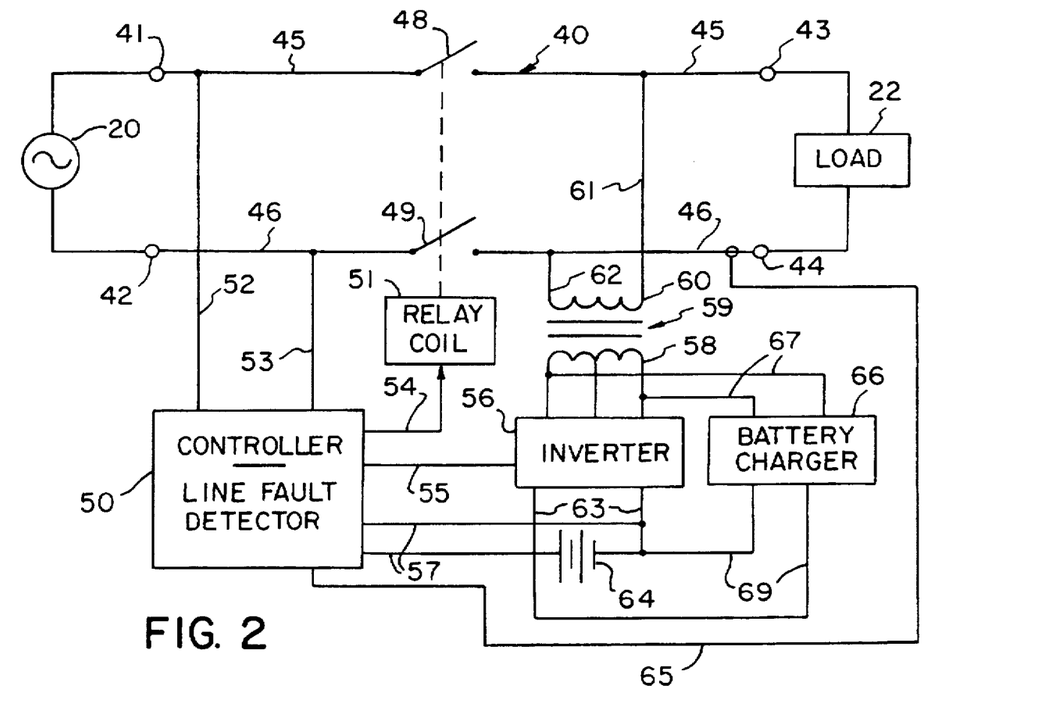
FIG. 2 is a simplified block diagram of a backup power system incorporating the present invention.

A simplified block diagram of a backup power system incorporating the present invention is shown generally at 40 in FIG. 2. The backup power system 40 is connected to receive power from a main AC power system 20 at its input terminals 41 and 42 and to provide power to a load 22 from its output terminals 43 and 44. The load 22 may consist of one or more PFC loads 12 as described previously with respect to FIG. 1. The backup power system 40 has a main power path comprising a first power line 45 connected between the input terminal 41 and the output terminal 43 and a second power line 46 connected between the input terminal 42 and the output terminal 44. A first relay contact switch 48 is connected in the power path line 45 to selectively provide or break conduction continuity on the line 45 to connect or disconnect the supply of power between the input terminal 41 and the output terminal 43. A second relay contact switch 49 may be connected in the power path line 46 to be operated simultaneously with the switch 48, although only one of the switches 48 or 49 is required to provide system operation. The relay switches 48 and 49 are operated by a relay coil 51, which, when energized, closes the switches 48 and 49 (although the switches 48 and 49 could be operated such that they are normally closed and are opened when the relay coil 51 is energized). In this exemplary backup power system 40, the relay switches 48 and/or 49 are the only electrical control components connected in the main power path composed of the power lines 45 and 46, so that when the switches 48 and 49 are closed, a very low resistance electrical conducting path is provided between the terminals 41 and 43, and the terminals 42 and 44.

The backup power system 40 further includes a controller 50 which is connected by conducting lines 52 and 53 to the power path lines 45 and 46, respectively, to monitor the voltage across these lines, and thereby the voltage across the input terminals 41 and 42 from the AC power system 20. The controller 50 may also be connected by lines 57 and 65 to the system battery 64 and the output line 45 to provide battery voltage and output current measurements, respectively, for use by the controller 50. The controller 50 is connected by control lines 54 to the relay coil 51 to energize or de-energize the coil as appropriate. The controller 50 is further connected by control lines 55 to the inverter 56. The inverter 56 is connected to the primary 58 of a transformer 59. The secondary 60 of the transformer 59 is connected by lines 61 and 62 to the power path lines 45 and 46. The inverter 56 receives DC power on lines 63 from a battery 64. When the inverter is operating, it converts the DC power from the battery 64 to AC power on the primary 58 of the transformer 59. With the AC power from the secondary 60 of the transformer being imposed across the lines 45 and 46 and thus across the output terminals 43 and 44 to supply power to the load 22. A battery charger 66 receives input power on lines 67 from the primary 58 of the transformer, which acts as a secondary when power is available on the lines 45 and 46 from the main AC power system 20. The battery charger 66 provides DC charging power on lines 69 to the battery 64 to keep it at a desired level of charge.

When the controller 50 determines that a fault has occurred in the power supplied from the main AC power system 20, it issues a control signal on the lines 54 to control the relay coil 51 to open the switches 48 and 49, while simultaneously applying control signals on the lines 55 to the inverter 56 to turn on the inverter to provide AC power to the primary 58 of the transformer 59. Various known methods may be used by the controller 50 to detect power line faults in a rapid and efficient manner. Such methods preferably determined both when the AC waveform is sufficiently out of tolerance (either high or low in voltage) or is distorted so as to constitute an unusable power waveform (or no power at all) while avoiding unnecessary switches to inverter power which would deplete the battery and introduce unnecessary power glitches. An exemplary method of line fault detection compares sampled AC input voltage levels with a reference voltage waveform, and initiates the transition from AC line to inverter power when the sampled waveform deviates from the reference waveform by a selected amount. Under steady state conditions, the system controller 50 controls the inverter 56 to provide a regulated output voltage signal at a desired RMS voltage level. If the controller detects a demand for excess output current, it will shut down the inverter 56 to protect the circuit components from damage. Additional details on the structure and operation of a backup power system of the type illustrated in FIG. 2, including a more detailed description of a preferred line fault detection scheme, may be found in U.S. patent application Ser. No. 08/377,540, entitled "Backup Power System and Method", filed on Jan. 24, 1995, now U.S. Pat. No. 5,579,197 the disclosure of which is hereby incorporated by reference.

Figure 3:
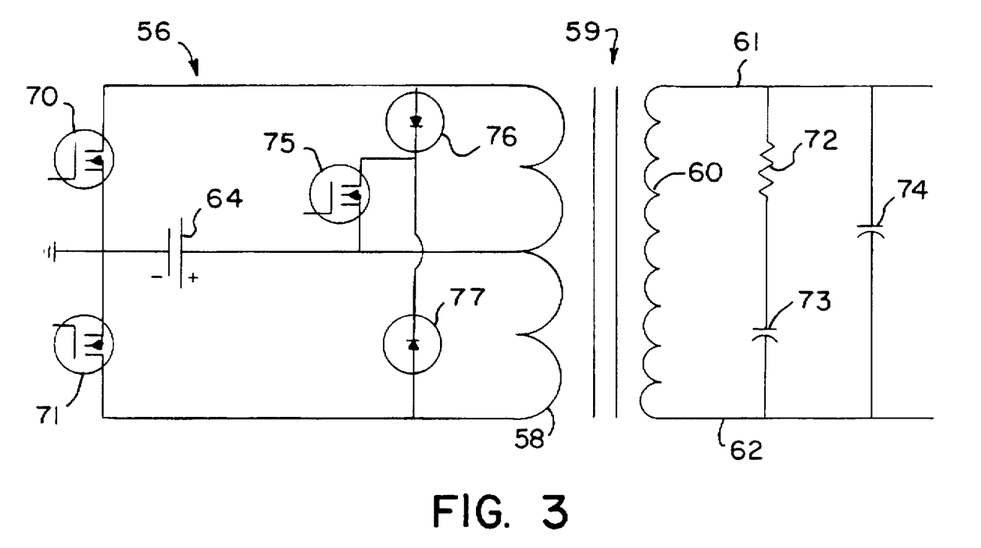
FIG. 3 is a schematic circuit diagram of a push-pull stepped square wave inverter that may be controlled in accordance with the method of present invention.

An exemplary inverter topology that may be used in the backup power system 40 is a push-pull stepped square wave inverter 56 as illustrated in FIG. 3. The inverter 56 provides power from the battery 64 to a load through the transformer 59. The primary winding 58 of the transformer 59 has a center tap which is connected to the positive terminal of the battery 64. End terminals of the primary winding 58 are connected to the negative terminal of the battery 64 through power switching devices 70 and 71. The power switching devices 70 and 71 are preferably implemented using transistors such as MOSFETs.

The power switching devices 70 and 71 are alternately turned on and off to apply the battery voltage across one half of the primary winding 58. When the switching device 70 is turned on, the DC voltage from the battery 64 is applied to the primary winding 58 of the transformer 59, and a corresponding voltage signal appears on the output lines 61 and 62 of the secondary winding 60 of the transformer 59. When the switching device 71 is turned on, a voltage signal of equal magnitude but opposite polarity is produced on the lines 61 and 62.

During the period when either switching device 70 or 71 is turned on, current builds up in the transformer windings. When the switching device 70 or 71 is turned off, thereby interrupting the flow of current, the stored energy in the transformer, which cannot be immediately dissipated, will cause a rapid voltage rise across the switching device 70 or 71. A free wheel circuit, including switching device 75 and diodes 76 and 77, is used to prevent this voltage rise by providing a current conduction path for the energy stored in the transformer windings. When a switching device 70 or 71 is turned off, switching device 75 is turned on to provide a conduction path from the transformer, through one of the diodes 76 or 77 and the switching device 75 to the positive terminal of the battery 64. The energy stored in the transformer windings during the time when the switching device 70 or 71 is turned on is thus returned to the battery 54 after the switching device 70 or 71 is turned off.

A dead space is thus provided for the free wheel period between switching off one of the switching devices 70 or 71 and switching on the other of the switching devices 71 or 70. During this time, the battery is not connected to the transformer 59. Thus, the signal appearing on the lines 61 and 62 of the inverter 56 is a stepped square wave voltage signal. The frequency of the output signal and the width of the square wave pulses, defined by the on time of the switching devices 70 or 71, is determined by the inverter controller 50. A resistor 72 and capacitors 73 and 74 are preferably provided across the secondary winding 60 of the transformer 59 to filter unwanted frequency components from the stepped square wave output of the inverter 56.

The amplitude of the output voltage of the inverter 56 at any point in time is approximately equal to the voltage impressed across the primary winding 58 of the transformer 59 multiplied by the turns ratio of the transformer 59. The voltage impressed across the primary transformer winding 58 is equal to the battery voltage less the voltage drop across the switching devices 70 or 71. In the case of MOSFET switching devices, this voltage is the drain-to-source voltage drop across the transistor 70 or 71 when the transistor 70 or 71 is conducting. The RMS output voltage level of the inverter 56 is related to the amplitude of the output voltage pulses, and the pulse width. The inverter pulse width is defined herein to be the duration of the output signal half cycle during which the switching devices 70 or 71 are on and conducting. Thus, the pulse width divided by the duration of the half cycle is the inverter duty cycle. The wider the pulse width for a given amplitude, the greater the RMS output voltage level of the inverter 56. The RMS output voltage level of the square wave inverter 56 may be defined by the following equation:

$$V_{RMS} = V_o \sqrt{\frac{2P_w}{T}} \qquad (1)$$

where $V_o$ is the amplitude of the output voltage pulse,

Pw is the pulse width, and

T is the full period of the inverter output waveform cycle. From this equation, it is apparent that the maximum output RMS voltage level of the inverter 56 is approximately $V_o$, which occurs when the pulse width is maximized at a full half cycle, T/2.

As long as AC power is provided by the AC power supply 20 to the load 22, the inverter 56 of the backup power system 40 is turned off. As soon as the system controller 50 detects a line fault, it provides a signal on the line 54 to open the relays 48 and 49, thereby isolating the load 22 from the AC power system 20. Simultaneously, the controller 50 provides control signals on the line 55 to begin operation of the inverter 56. During this transition period between AC line and inverter operation there may be a brief drop in the voltage level supplied to the load 22. As described previously, a PFC load will respond to this voltage drop by drawing an increased amount of current from the inverter 56, causing the output voltage of the inverter 56 to drop even further. To prevent load drops due to the backup power system 40 reaching its conduction limit, the system controller 50 preferably begins operation of the inverter 56 following transition from line power using an inverter pulse width which is at or near the maximum inverter pulse width. An inverter pulse width of at least approximately ⅞ths of the maximum pulse width may, for example, preferably be used under these conditions to minimize the voltage drop. This pulse width will typically be wider than that normally required to provide the desired steady state output voltage level under normal operating conditions. The inverter pulse width is then gradually reduced until the RMS output voltage level of the inverter is at the desired RMS voltage level, e.g., 120 or 230 volts. This gradual reduction will prevent oscillations in the output voltage level.

The need for a rapid change to a full pulse width or near full pulse width also exists when there is a step increase in the load being supplied by the inverter. A load increase can be detected by monitoring the output current or the amplitude of the voltage pulse provided on the output of the inverter. Output current will increase significantly when a load is added to the inverter, and the voltage amplitude will decrease significantly. Either of these conditions may be used to indicate the need to immediately widen the pulse width. It should be understood that monitoring the battery current is equivalent to monitoring the output current, when the turns ratio of the transformer is known. Thus, a transient condition may also be indicated by a rise in the battery current.

In the exemplary backup power system 40, the inverter controller 50 is preferably provided with signals that represent the DC voltage level at the input to the inverter 56, e.g., the battery voltage, the voltage drop across the inverter switching devices, and the output current being provided to the load 22. Using these quantities, and the transformer turns ratio, the inverter controller 50 computes the pulse width which will result in the desired steady state output RMS voltage level. As the DC voltage from the battery decreases as the battery discharges or ages, the pulse width must gradually increase to maintain the desired steady state voltage level. However, the inverter controller 50 must be able to distinguish between the need for this gradual increase in pulse width, and the need for an immediate increase to near full pulse width that is required when there is a step load increase due to a load being added to the inverter.

A method for distinguishing between the need for a gradual increase in pulse width and the need for an immediate increase to near full pulse width is to base the decision on the computation of the pulse width needed to maintain the steady state regulated output voltage level. If the pulse width change needed to maintain the output voltage level is more than a certain fraction of the total period of the output waveform cycle, a step load change is indicated, and the inverter is controlled to go to near full pulse width. This transition to full pulse width is preferably accomplished within one cycle of determining the occurrence of a transient condition, although it may take longer. The threshold level of change in the required pulse width should be selected such that, under steady state load conditions, pulse width increases required due to normal reductions in battery voltage will be less than this threshold change level. As an example, the half period of the output voltage cycle may be divided into 64 equal increments. In such a case, a pulse width needed to maintain the desired steady state output voltage level that is, for example, four or more increments greater than the pulse width of the previous cycle, would indicate a step load change, requiring an immediate increase to maximum pulse width.

Quickly increasing the inverter pulse width will increase the inverter output voltage, thereby causing the PFC load to decrease its current demand. This improves the load handling capability of the inverter, and minimizes the possibility of load drops due to the inverter being forced into conduction limit mode. However, quickly decreasing the pulse width may initiate an oscillatory pattern, with the inverter alternately increasing and decreasing its pulse width dramatically. This is undesirable. Therefore, although the pulse width is allowed to widen to a maximum pulse width very quickly, preferably within just one cycle, the pulse width is only allowed to narrow very slowly from this maximum amount. Thus, in this example, the inverter pulse width is decremented by no more than one increment, i.e., 1/64th of the maximum pulse width, per cycle from the maximum pulse width. The pulse width is thereby gradually reduced to the pulse width needed to maintain the desired steady state output voltage level of the inverter.

Figure 4:
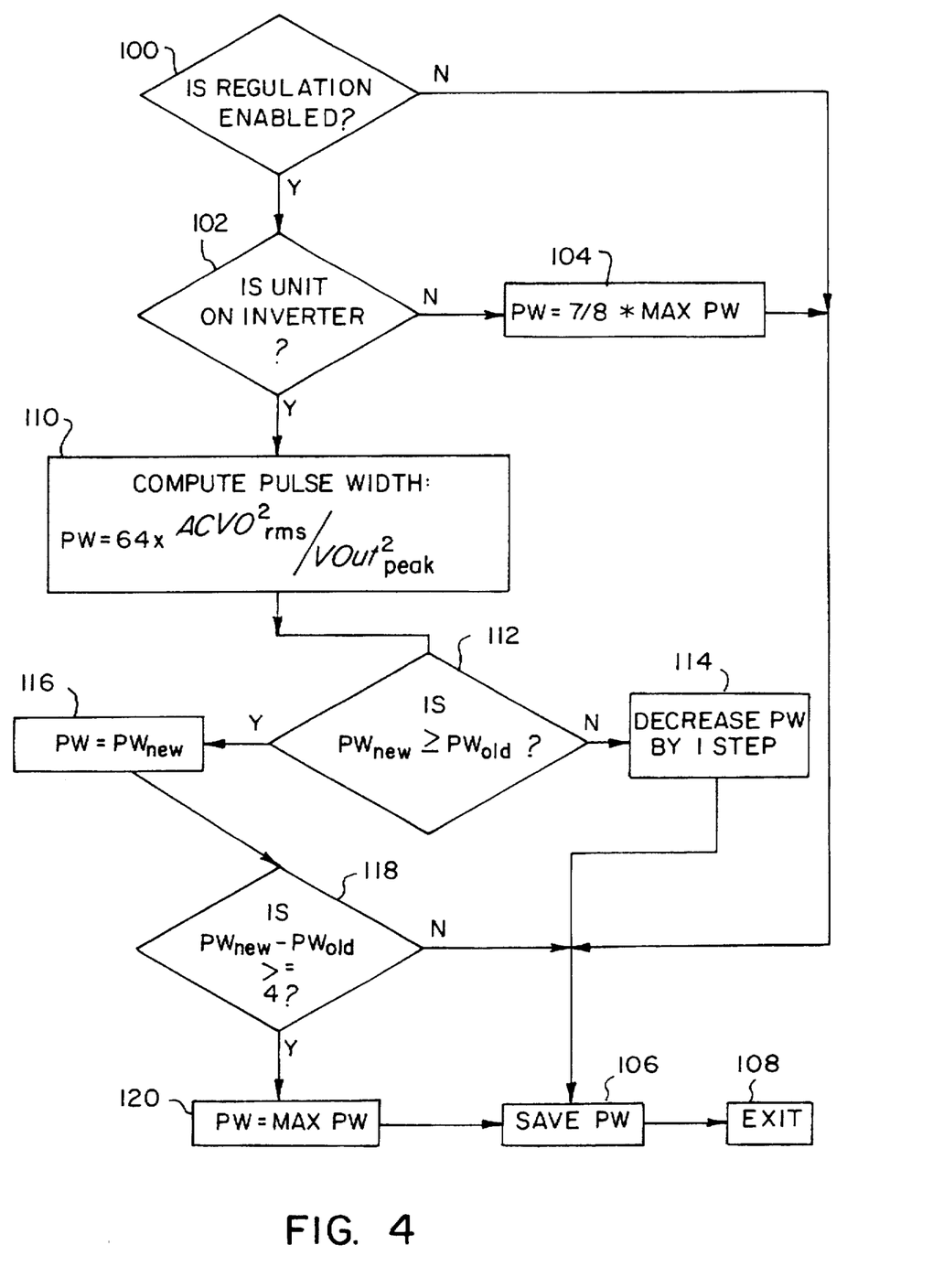
FIG. 4 is a flow chart showing steps of an exemplary inverter duty cycle algorithm carried out by a microcontroller of a backup power system for controlling a square wave inverter in accordance with the present invention.

A flow chart illustrating exemplary steps of an inverter duty cycle algorithm for controlling a square wave inverter in a backup power system to provide a regulated RMS output voltage level under steady state conditions and to support PFC loads under transient conditions is provided in FIG. 4. This algorithm is preferably executed once each cycle to determine the pulse width to be used during that cycle. An exemplary software program listing for implementing this algorithm is also provided at the end of this specification.

At step 100, the algorithm determines if regulation of the inverter output voltage is enabled. If not, the rest of the steps of the algorithm are skipped, and the inverter is controlled using a fixed predefined pulse width value. If regulation of the inverter output voltage is not enabled, the inverter controller will not be able to respond to inverter load changes to prevent the system from reaching a conduction limit.

If the regulation capability of the inverter controller is enabled, the inverter duty cycle algorithm determines, at step 102, whether the backup power system was providing inverter power during the previous cycle. If not, the inverter has just been turned on, which may occur when the backup power system itself is first turned on, or as a result of a transfer from AC line power to backup inverter power following an AC line fault detection. In such a case, the pulse width is immediately set to ⅞ths of the maximum pulse width at step 104. E.g., where the half cycle is divided into 64 increments, the pulse width is set at step 104 to 56 increments. Of course other pulse width values may also be used. However, the pulse width will be set preferably at or near the maximum pulse width or to a pulse width greater than that which would normally be required to maintain the output voltage at the desired RMS voltage level under steady state operating conditions. The pulse width determined in step 104 is then saved at step 106 and the inverter duty cycle algorithm exits at step 108.

If the backup power system was providing inverter power during the previous cycle, the inverter duty cycle algorithm proceeds to step 110 wherein the pulse width necessary to maintain the RMS output voltage level of the inverter at a desired level (e.g., 120V or 230V) is calculated. Assuming that the half cycle period is divided into 64 increments, the estimated pulse width, in increments, needed to maintain the desired RMS output voltage level is defined by the equation:

$$PW = 64 * ACVO^2_{rms} / VOut^2_{peak} \quad (2)$$

where,

PW is the pulse width applied to the gates of the inverter switching devices in increments, $ACVO^2_{rms}$ is the desired steady state RMS output voltage level in volts (e.g., 120V or 230V), and $VOut^2_{peak}$ is the amplitude of the output voltage pulse in volts. Note that the pulse width (PW), in this case, is only allowed to be set to a level less than or equal to 63 increments. This allows for the necessary dead space between switching off and on the inverter switches. Also note that $64 * ACVO^2_{rms}$ is a constant. Therefore, a look up table can be used to find the desired pulse width for a given amplitude of the output voltage waveform.

The amplitude of the output voltage waveform may be measured directly, or can be estimated using the formula $$VOut_{peak} = [V_{bat} - V_{ds} - (ACAO * Req * TRatio)] * TRatio \quad (3)$$

where $V_{bat}$ is the measured battery voltage, $V_{ds}$ is the drain-source voltage drop of the inverter switching devices, ACAO is the measured output current level, Req is the equivalent resistance of the transformer windings, and TRatio is the turns ratio of the transformer.

At step 112 the newly calculated pulse width is compared with the pulse width used during the previous cycle. If the newly calculated pulse width is less than the pulse width used in the previous cycle, the pulse width used during the previous cycle is decreased by one increment at step 114. This new pulse width is saved at step 106 and the inverter duty cycle algorithm exits at step 108. This procedure ensures that a pulse width that is increased dramatically in response to either the initial turning on of the inverter or an increase in the load being supported by the inverter is gradually reduced to the pulse width necessary to maintain the desired steady state RMS output voltage level, thereby preventing oscillations due to feedback interactions between the inverter controller and a PFC supply.

If, at step 112 of the inverter duty cycle algorithm, it is determined that the newly calculated pulse width is greater than the pulse width used in the previous cycle, the pulse width to be used during the present inverter cycle is set to the newly calculated pulse width at step 116. At step 118, the new pulse width is compared with the pulse width used during the previous cycle. If the difference between the two pulse widths is less than a selected number of increments, e.g., 4 increments, steady state conditions are presumed, the pulse width is saved at step 106, and the inverter duty cycle algorithm exits as step 108. However, if the newly calculated pulse width is greater than or equal to the selected number of increments, in this case 4 increments, the inverter controller assumes that a transient condition has occurred, such as a new load has been added to the inverter, thereby causing a sudden decrease in the output voltage level. (Under steady state conditions, pulse width increases due to reductions in battery voltage will almost always be less than 4 increments/cycle.) In such a case, the pulse width to be used during the present duty cycle is immediately set to the maximum pulse width at step 120. This maximum pulse width is then saved as step 106, and the inverter duty cycle algorithm exists at step 108. It should be understood, in this case, that the maximum pulse width set by step 120 would not exceed 63 increments, in order to allow for a dead space between switching of the inverter switching devices. Thus, the term "maximum pulse width" as used here and throughout the specification and claims means a wide pulse width at or near the maximum pulse width. What is important is that the pulse width be immediately increased to a pulse width at or near the maximum pulse width which is larger than that required to provide the desired RMS output voltage level under steady state conditions. In other words, the pulse width which is used should be wide enough to provide an RMS output voltage level that is large enough to prevent the PFC loads that are supported by the inverter from driving the inverter into conduction limit mode.

Figure 5:
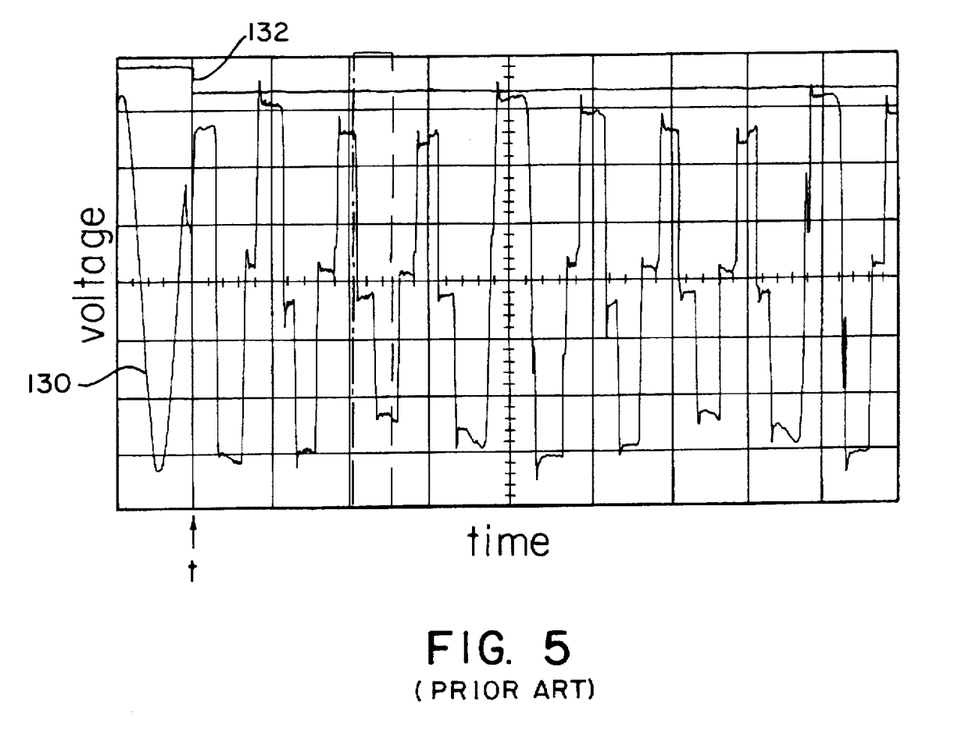
FIG. 5 is a graph of an output voltage waveform of a square wave inverter in a backup power system providing power to a PFC load under transient conditions and not incorporating the present invention.
Figure 6:
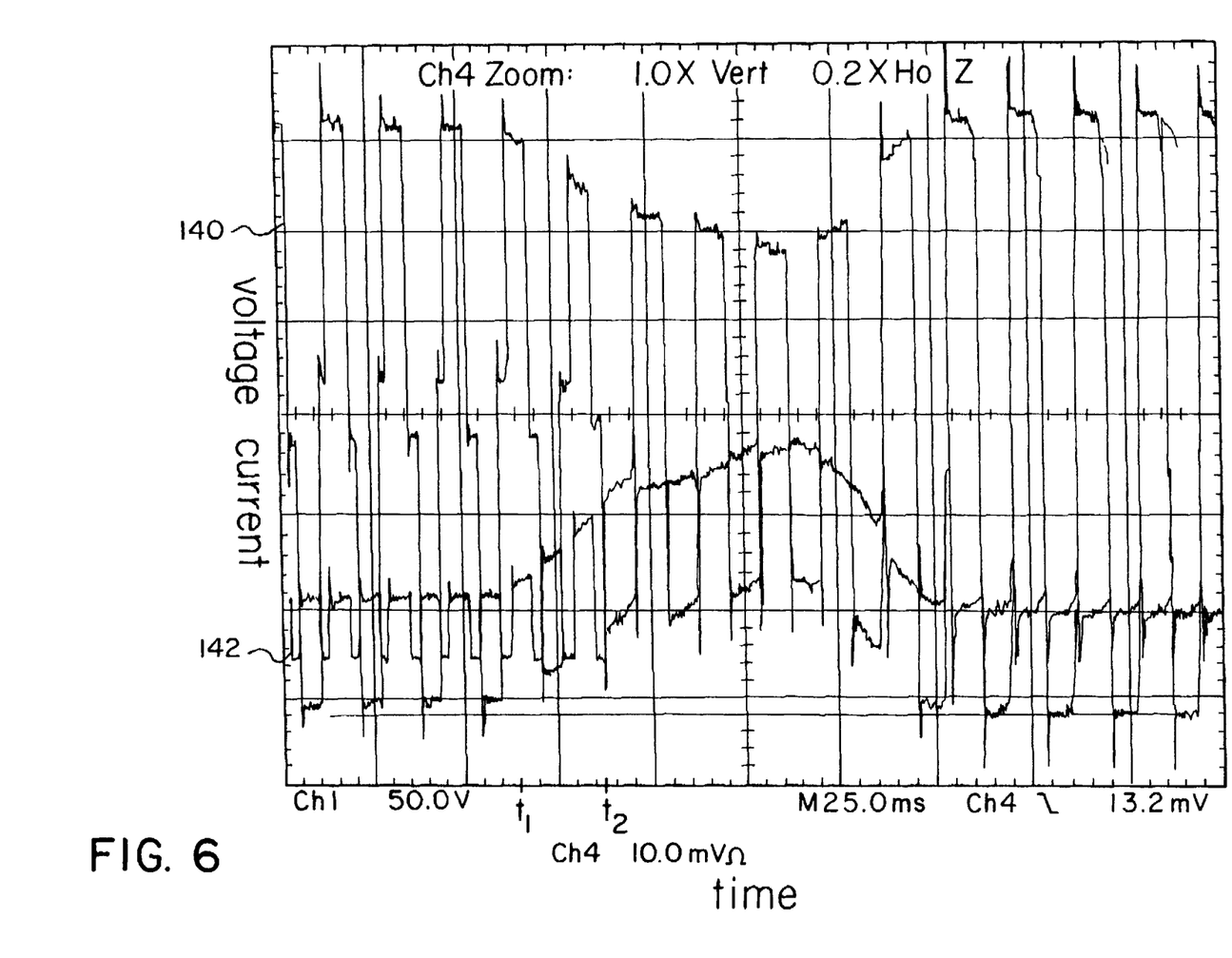
FIG. 6 is a graph of exemplary output voltage and current waveforms for a square wave inverter providing power to a power factor corrected load under transient conditions and controlled in accordance with the present invention.

The effectiveness and operation of a square wave inverter controlled in accordance with the present invention to support PFC loads is illustrated by the waveforms of FIGS. 5 and 6. FIG. 5 illustrates the output voltage of a backup power system at 130. The backup power system includes a square wave inverter that is controlled in a conventional manner to provide a regulated output voltage level to a 100% PFC load, but does not incorporate the present invention. Prior to time t, the backup power system provides power to the PFC load from an AC power source. Thus, the output voltage waveform of the backup power system is approximately sinusoidal. Just prior to time t, the backup power system controller detects a line fault. In response to the detected line fault, the backup power system controller changes the line relay signal 132 to isolate the load from the failed AC power system. At the same time, the power system controller begins operation of the inverter. As the inverter controller tries to regulate the output voltage, the PFC load responds by increasing its current demand in response to reductions in its input voltage and decreasing its current demand in response to increases in its input voltage. These increasing and decreasing current demands effect the output voltage provided by the inverter and create a feedback loop with the inverter controller. In this case, although conduction limit is not reached and the load is not dropped, it is apparent that the effect of the PFC load is to initiate an oscillatory pattern in the inverter output, with the inverter alternately increasing and decreasing its pulse width dramatically. In this example, the half cycle RMS voltage level varied between a minimum of 170 Volts and a maximum of 299 Volts around the desired RMS output voltage level of 230 Volts.

FIG. 6 illustrates the operation of a backup power system with a square wave inverter and incorporating inverter control in accordance with the present invention. The output voltage waveform of the power supply is illustrated at 140, and the output current waveform from the power supply battery is illustrated at 142. Prior to time $t_1$, the power system is operating under steady state conditions. Under these conditions, the inverter pulse width is set to maintain a steady desired RMS output voltage level as the inverter provides power to a PFC load. At time $t_1$, the inverter load changes. The existing PFC load responds by increasing its current demands. Thus, the inverter current begins to increase as the RMS output voltage of the inverter begins to drop. Just prior to time $t_2$, the output voltage drop reaches the point where the inverter controller determines the occurrence of a transient condition. The inverter controller responds by immediately increasing the inverter pulse width to approximately the full pulse width. This causes the rise in current, and the fall in output voltage, to level off, thereby preventing the inverter from being forced to shut down due to an excessive current level. As the transient condition passes, the inverter output voltage returns to its steady state output RMS voltage level and the inverter pulse width is gradually reduced, in incremental steps, to the pulse width employed before the transient condition occurred. As illustrated, there are no oscillations in the RMS output voltage level or in the inverter pulse width following recovery of the inverter from the transient condition.

Following is an exemplary software program listing for implementing the inverter duty cycle algorithm described previously. This program listing is subject to copyright protection.

```
Copyright 1996, Best Power
;*******************************************************************************
;Subroutine:   InvPWCtrl
;Function:         Control inverter gating pulse width:
;
;
;              ACVOrms = [PW * VOutPk^2/64]^1/2 -OR-
;              PW = 64 * ACVOrms^2/VOutPk^2
;
;              where:
;              ACVOrms = desired rms output in volts (e.g. 120 V or 230 V)
;              PW = Pulse width of inverter gate (PW <= 63)
;              VOutPk is the amplitude of the output voltage waveform.
;
;              Since (64 * ACVOrms^2) is a constant, we can use a look up
;              table to find our desired PW for a given VOutPk.
;-------------------------------------------------------------------------------
;              Since no VOut monitor exists, VOutPk is estimated using the
;              formula: VOutPk = [VBatt-Vds-(ACAO*Req*TRatio)] * TRatio
;
;              including all scaling, this formula becomes:
;
;              VOutPk = [(VBatt * 1/32 * 5 V/256 * VBScale) -
;                  (Vds * 1/32 * 5 V/256) -
;                  (ACAO * 1/32 * 5 V/256 * AOScale/0.025) *
;                  (Req/1280) * (TRatio/8)] * (TRatio/8)
;
;              where: VBScale = 1/0.306 = 3.268 for 12 V units
;                     VBScale = 1/0.153 = 6.536 for 24 V units
;
;                     AOScale = 1/17.36 + 14.7/256 for 650VA, 230 V units
;                     AOScale = 1/7.87 + 32.5/256 for 650VA, 120 V units
;                     AOScale = 1/12.12 + 21.1/256 for 920VA, 230 V units
;                     AOScale = 1/5.62 + 45.6/256 for 920VA, 120 V units
;
;                     650VA, 230 V units (TR = 30 * 8 = 240)
;                     650VA, 120 V units (TR = 15 * 8 = 120)
;                     920VA, 230 V units (TR = 15 * 8 = 120)
;                     920VA, 120 V units (TR = 7.5 * 8 = 60)
;
;              This formula simplifies to:
;
;              VOutPk + TRatio * 5/(256*256) *
;                  [(VBatt * VBScale) - Vds -
;                   (ACAO * Req * TRatio * AOScale/256)]
;
;Destroyed:    A,X
;*******************************************************************************
InvPWCtrl:     BRCLR  3,TestCtrl,PWCtrl0      ;Regulation disabled?
     RTS                  ; Yes, exit
PWCtrl0:       BRSET  0,XferCtrl,PWCtrl1      ;On inverter?
     JMP                  PWCtrlXfer  ; No, force max PW (BRA assist)
;              Estimate the amplitude of the output voltage waveform: VOutPk
;              Step #1: Compute (ACAO*Req*TRatio*AOScale/256)
PWCtrl1:       LDA    ACAO+1                 ;[X,A] <- ACAO
               LDX    ACAO                   ;
               CPX    #8                     ;Extremely large ACAO?
               BLO    PWCtrl2                ; No, continue
               LDA    #0F8h                  ; Yes, limit ACAO to 07F8h
```

-continued

Copyright 1996, Best Power

```
              LDX     #07h         ;
PWCtrl2:      ASRX                 ;A ← 32/256 * ACAO
              RORA                 ;
              ASRX                 ;
              RORA                 ;
              ASRX                 ;
              RORA                 ;
              BCC     PWCtrl3      ;Round up?
              INCA                 ; Yes
PWCtrl3:      LDX     TRatio       ;X ← TRatio
              MUL                  ;X ← 32/256^2 * ACAO * TRatio
              CMP     #80h         ;Round up?
              BLO     PWCtrl4      ; No
              INCX                 ; Yes
PWCtrl4:      STX     Temp1        ;Save temp result
;             Calculate Req. Based upon table lookup of present InvPW and an
;             offset of ReqOffset.
              LDA     InvPW        ;A ← InvPW
              SUB     #27          ;Subtract table offset. Underflow?
              BCC     PWCtrl5      ; No, use table index as is
              LDA     #0           ; Yes, force table index to 0
PWCtrl5:      TAX                  ;X ← Req table index
              LDA     ReqTbl,X     ;A ← Req table value
              ADD     ReqOffset    ;Add in calibration offset
              STA     Req          ;Save new Req
              LDX     Temp1        ;Get back: 32/256^2 * ACAO * TRatio
              MUL                  ;X ← 32/256^3 *ACAO*TRatio*Req
              CMP     #80h         ;Round up?
              BLO     PWCtrl6      ; No
              INCX                 ; Yes
PWCtrl6:      STX     Temp1        ;Save temp result
              LDA     RConfig      ;Determine table offset
              AND     #00110000q   ;
              ASRA                 ;
              ASRA                 ;
              ASRA                 ;
              ASRA                 ;
              TAX                  ;
              LDA     AOTbl,X      ;A ← ACAO scaling factor
              LDX     Temp1        ;Restore temp result
              MUL                  ;[X,A]←128/256^2*ACAO*TRat*Req*AOScale
              ASLA                 ;[X,A] ← ACAO*TRatio*Req*AOScale/256
              ROLX                 ;
              STA     Temp1+1      ;Store temp result
              STX     Temp1        ;
;             Step #2: Compute (VBatt * VBScale).
              LDA     VBatt+1      ;[X,A] ← VBatt
              LDX     VBatt        ;
              ASLA                 ;[X,A] ← VBatt * 4
              ROLX                 ;
              ASLA                 ;
              ROLX                 ;
              CMP     #80h         ;Round up?
              BLO     PWCtrl7      ; No
              INCX                 ; Yes
PWCtrl7:      LDA     #209         ;[X,A] ← VBatt * 4 * 209/256
              MUL                  ;(i.e. [X,A] ← VBatt * 3.268)
              BRCLR   4,RConfig,PWCtrl8     ;24 V unit?
              ASLA                 ; Yes, [X,A] ← VBatt * 2 * 3.268
              ROLX                 ;
;             Step #3: Compute (VBatt * VBScale) – Vds.
PWCtrl8:      SUB     Vds+1        ;[X,A] ← (VBatt * VBScale) – Vds
              STA     Temp1+2      ;
              TXA                  ;
              SBC     Vds          ;
              TAX                  ;
              LDA     Temp1+2      ;
;             Step #4: Compute (VBatt*VBScale)–Vds–(ACAO*Req*TRatio/AOScale*256)
              SUB     Temp1+1      ;A ← Vxfmr/256
              STA     Temp1+1      ;
              TXA                  ;
              SBC     Temp1        ;
              BRCLR   7,Temp1+1,PWCtrl9     ;Round up?
              INCA                 ; Yes
;             Step #5: Compute 5/256 * TRatio * Vxfmr
PWCtrl9:      LDX     TRatio       ;[X,A] ← TRatio * Vxfmr/256
              MUL                  ;
              CMP     #80h         ;Round up?
```

Copyright 1996, Best Power

```
                BLO     PWCtrl10        ; No
                INCX                    ; Yes
PWCtrl10:       LDA     #5              ;[X,A] ← 5/256 * TRatio * Vxfmr
                MUL                     ;
                BRCLR   5,RConfig,PWCtrl11      ;230 V unit?
                ASRX                    ; Yes, scale VOutPk as 2 volt units
                RORA                    ;
PWCtrl11: STA                           VOutPk;Store VOutPk in 1 volt units for 115 V
                                        ;models and in 2 volt units for 230 V.
;               A ← Estimated VOutPk. Use table look-up to determine InvPW.
                CLRX                    ;Init table index
PWCtrl12:       CMP     PWTbl,X         ;VOutPk >= table voltage?
                BHS     PWCtrl13        ; Yes, pulse width found
                INCX                    ; No, increment index
                BRA     PWCtrl12        ;Continue search
PWCtrl13:       TXA                     ;A ← Table index
                ADD     #MinPW          ;Add in minimum allowed pulse width
                CMP     InvPW           ;New PW >= Old?
                BHS     PWCtrl14        ; Yes, increase PW quickly
                DEC     InvPW           ; No, slowly decrease PW to new value
                BRA     PWCtrlX         ;Exit
;               New InvPW >= Old InvPW.
;               If new InvPW increases by more than 4, force InvPW to max allowed
;               and request gate retrigger.
PWCtrl14:       TAX                     ;Save New PW
                SUB     InvPW           ;
                CMP     #4              ;(New PW) >= (Old PW + 4)?
                BHS     PWCtrl15        ; Yes, force max PW
                TXA                     ; No, save new PW as is
                BRA     PWCtrlY         ;
PWCtrl15:       BSET    5,XferCtrl      ;Request gate retrigger
PWCtrlMax:      LDA     #MaxPW          ;Max pulse width @ step load
PWCtrlY:        STA     InvPW           ;Save new inverter pulse width
PWCtrlX:        RTS                     ;Exit
PWCtrlXfer: LDA         #XferPW         ;7/8 pulse width @ xfer to inverter
                STA     InvPW           ;
                RTS                     ;Exit
;****************************************************************************
;               InvPW dependent Req table
;****************************************************************************
ReqTbl:DB 0B6h  ;27 = InvPW
       DB 0B0h  ;28 = InvPW
       DB 0AAh  ;29 = InvPW
       DB 0A6h  ;30 = InvPW
       DB 0A1h  ;31 = InvPW
       DB 09Ch  ;32 = InvPW
       DB 098h  ;33 = InvPW
       DB 093h  ;34 = InvPW
       DB 08Eh  ;35 = InvPW
       DB 08Ah  ;36 = InvPW
       DB 085h  ;37 = InvPW
       DB 080h  ;38 = InvPW
       DB 07Dh  ;39 = InvPW
       DB 079h  ;40 = InvPW
       DB 076h  ;41 = InvPW
       DB 073h  ;42 = InvPW
       DB 070h  ;43 = InvPW
       DB 06Dh  ;44 = InvPW
       DB 069h  ;45 = InvPW
       DB 066h  ;46 = InvPW
       DB 063h  ;47 = InvPW
       DB 060h  ;48 = InvPW
       DB 05Dh  ;49 = InvPW
       DB 059h  ;50 = InvPW
       DB 056h  ;51 = InvPW
       DB 053h  ;52 = InvPW
       DB 050h  ;53 = InvPW
       DB 04Dh  ;54 = InvPW
       DB 049h  ;55 = InvPW
       DB 046h  ;56 = InvPW
       DB 043h  ;57 = InvPW
       DB 040h  ;58 = InvPW
       DB 03Dh  ;59 = InvPW
       DB 039h  ;60 = InvPW
       DB 036h  ;61 = InvPW
       DB 033h  ;62 = InvPW
       DB 030h  ;63 = InvPW
;****************************************************************************
```

-continued

Copyright 1996, Best Power

```
;               ACAO amplifier gain = 4*256/(Table value)
;****************************************************************
   AOTbl: DB 130     ;00: 12V battery; 115V output (7.88)
          DB 182     ;01: 24V battery; 115V output (5.62)
          DB  59     ;10: 12V battery; 230V output (17.36)
          DB  84     ;11: 24V battery; 230V output (12.19)
;****************************************************************
;           TRatio table: based upon model index bits in RConfig.
;           TRatio = (actual turns ratio) * 8.
;****************************************************************
   TRTbl: DB 120     ;00: 12V battery; 115V output (15.0)
          DB  60     ;01: 24V battery; 115V output (7.5)
          DB 230     ;10: 12V battery; 230V output (28.8)
          DB 115     ;11: 24V battery; 230V output (14.4)
;****************************************************************
;           Inverter pulse width look up table for 115/230V units.
;           Computed using formula:
;           [VOutPk^2 * PW/64]^1/2 = VOutRMS -or-
;           VOutPk^2 * PW = VOutRMS^2 * 64
;           VOutRMS is 115V for the table below.
;****************************************************************
   PWTbl: DB 217     ;PW = 18
          DB 211     ;     19
          DB 206     ;     20
          DB 201     ;     21
          DB 196     ;     22
          DB 192     ;     23
          DB 188     ;     24
          DB 184     ;     25
          DB 180     ;     26
          DB 177     ;     27
          DB 174     ;     28
          DB 171     ;     29
          DB 168     ;     30
          DB 165     ;     31
          DB 163     ;     32
          DB 160     ;     33
          DB 158     ;     34
          DB 156     ;     35
          DB 153     ;     36
          DB 151     ;     37
          DB 149     ;     38
          DB 147     ;     39
          DB 145     ;     40
          DB 144     ;     41
          DB 142     ;     42
          DB 140     ;     43
          DB 139     ;     44
          DB 137     ;     45
          DB 136     ;     46
          DB 134     ;     47
          DB 133     ;     48
          DB 131     ;     49
          DB 130     ;     50
          DB 129     ;     51
          DB 128     ;     52
          DB 126     ;     53
          DB 125     ;     54
          DB 124     ;     55
          DB 123     ;     56
          DB 122     ;     57
          DB 121     ;     58
          DB 120     ;     59
          DB 119     ;     60
          DB 118     ;     61
          DB 117     ;     62
          DB   0     ;     63
;           Note: Last table value MUST be 0 to ensure termination of search
```

It is understood that the present invention is not confined to the particular embodiments and examples set forth herein as illustrative, but embraces all such modified forms thereof as come within the scope of the following claims. In particularly, it should be understood that the present invention is not limited in application to square wave inverters or to backup power systems employing such inverters. The present invention may be employed to enhance the ability to support PFC loads of various power conversion systems employing various inverter topologies and inverter modulation schemes.

What is claimed is:

1. A method for controlling an inverter to provide an output voltage waveform on an output of the inverter for providing power to a power factor corrected load, comprising the steps of:

(a) controlling the inverter to provide a regulated output voltage waveform at a desired steady state RMS voltage level;

(b) determining the occurrence of a transient load change condition that causes the RMS voltage level of the output voltage waveform to drop suddenly;

(c) responding to the determination of the occurrence of the transient condition by controlling the inverter to rapidly increase the RMS voltage level of the output voltage waveform to a high RMS voltage level; and (d) controlling the inverter to gradually decrease the RMS voltage level of the output voltage waveform from the high RMS voltage level down to the desired steady state RMS voltage level.

2. The method of claim 1 wherein the step of determining the occurrence of a transient load change condition includes the steps of monitoring the output voltage waveform and determining the occurrence of a transient condition when the voltage level of the output voltage waveform drops by more than a selected amount.

3. The method of claim 1 wherein the step of determining the occurrence of a transient load change condition includes the steps of monitoring a current level on the output of the inverter and determining the occurrence of a transient condition when the current level increases by more than a selected amount.

4. The method of claim 1 wherein the step of responding to the determination of the occurrence of a transient condition includes the step of rapidly increasing the RMS voltage level of the output voltage waveform to approximately the maximum RMS output voltage level of the inverter.

5. The method of claim 1 wherein the step of responding to the determination of the occurrence of a transient condition includes the step of increasing the RMS voltage level of the output voltage waveform to the high RMS voltage level within a time period of one cycle of the output voltage waveform from the determination of the occurrence of the transient condition.

6. The method of claim 1 wherein the step of controlling the inverter to gradually decrease the RMS voltage level of the output voltage waveform includes the step of decreasing the RMS voltage level of the output voltage waveform from the high voltage level to the desired steady state RMS voltage level over a time period greater than one cycle of the output voltage waveform.

7. A method for controlling an inverter to provide a stepped square wave output voltage waveform having an output voltage waveform duty cycle on an output of the inverter for providing power to a power factor corrected load, comprising the steps of:

(a) regulating the output voltage waveform duty cycle to provide a desired steady state RMS voltage level on the output of the inverter;

(b) determining the occurrence of a transient load change condition that causes the RMS voltage level of the output voltage waveform to drop suddenly;

(c) responding to the determination of the occurrence of the transient condition by rapidly increasing the output voltage waveform duty cycle to a long duty cycle; and (d) gradually reducing the output voltage waveform duty cycle from the long duty cycle to a shorter duty cycle to gradually decrease the RMS voltage level of the output voltage waveform to the desired steady state RMS voltage level.

8. The method of claim 7 wherein the step of determining the occurrence of a transient load change condition includes the steps of monitoring the output voltage waveform and determining the occurrence of a transient condition when the voltage level of the output voltage waveform drops by more than a selected amount.

9. The method of claim 7 wherein the step of determining the occurrence of a transient load change condition includes the steps of monitoring a current level on the output of the inverter and determining the occurrence of a transient condition when the current level increases by more than a selected amount.

10. The method of claim 7 wherein the step of responding to the determination of the occurrence of a transient condition includes the step of rapidly increasing the output voltage waveform duty cycle to a duty cycle that is at least approximately $7/8$ of the maximum output voltage waveform duty cycle.

11. The method of claim 7 wherein the step of responding to the determination of the occurrence of a transient condition includes the step of increasing the output voltage waveform duty cycle to the long duty cycle within a time period of one cycle of the output voltage waveform from the determination of the occurrence of the transient condition.

12. The method of claim 7 wherein the step of gradually reducing the output voltage waveform duty cycle includes the step of reducing the output voltage waveform duty cycle from the long duty cycle to the shorter duty cycle over a time period greater than one cycle of the output voltage waveform.

13. The method of claim 7 wherein the step of gradually reducing the output voltage waveform duty cycle includes the step of reducing the output voltage waveform duty cycle at a rate of no more than approximately $1/64$ of the maximum output voltage waveform duty cycle for each cycle of the output voltage waveform.

14. The method of claim 7 wherein the step of determining the occurrence of a transient load change condition includes the step of determining the occurrence of a transient load change condition when a change in the output voltage waveform duty cycle of equal to or greater than a selected threshold change amount is required in any one cycle of the output voltage waveform in order to maintain the desired steady state RMS voltage level.

15. The method of claim 14 wherein the threshold change amount is approximately $4/64$ of the maximum inverter duty cycle.

16. The method of claim 7 wherein the step of responding to the determination of the occurrence of a transient condition includes the step of rapidly increasing the output voltage waveform duty cycle to approximately the maximum output voltage waveform duty cycle.

17. The method of claim 16 wherein the step of responding to the determination of the occurrence of a transient condition includes the step of rapidly increasing the output voltage waveform duty cycle to approximately $63/64$ of the maximum inverter duty cycle.

18. A method of controlling a back up power system for providing power to a power factor corrected load from an AC power system under normal operating conditions and for providing power to the load from an inverter that is controlled to provide an output voltage waveform to the load when the AC power system fails, comprising the steps of:

(a) determining the occurrence of a failure of the AC power system;

(b) responding to the determination of the occurrence of a failure of the AC power system by controlling the inverter to provide an output voltage waveform having a desired steady state RMS output voltage level;

(c) determining the occurrence of a transient load change condition that causes the RMS voltage level of the output voltage waveform to drop suddenly;

(d) responding to the determination of the occurrence of the transient condition by controlling the inverter to rapidly increase the RMS voltage level of the output voltage waveform to a high RMS voltage level; and (e) controlling the inverter to gradually decrease the RMS voltage level of the output voltage waveform from the high RMS voltage level down to the desired steady state RMS voltage level following the response to the determination of the occurrence of the transient condition.

19. The method of claim 18 comprising additionally the step of responding to the determination of the occurrence of a failure of the AC power system by disconnecting the AC power system from the load.

20. The method of claim 18 wherein the step of responding to the determination of the occurrence of a transient condition includes the step of rapidly increasing the RMS voltage level of the output voltage waveform to approximately the maximum RMS output voltage level of the inverter.

21. A back up power system for providing power to a power factor corrected load from an AC power system under normal operating conditions and for providing power to the load from an inverter when the AC power system fails, comprising:

(a) line fault detection means for determining the occurrence of a failure of the AC power system and for providing a line fault detection signal;

(b) means for controlling the inverter to provide an output voltage waveform having approximately the maximum RMS output voltage level of the inverter in response to the line fault detection signal, thereby providing power to the load when the AC power system fails;

(c) means for controlling the inverter to gradually decrease the RMS voltage level of the output voltage waveform from the approximately maximum RMS voltage level down to a desired steady state RMS voltage level following the response to the line fault detection signal;

(d) means for controlling the inverter to provide a regulated output voltage waveform at the desired steady state RMS voltage level;

(e) transient condition detection means for determining the occurrence of a transient load change condition that causes the RMS voltage level of the output voltage waveform to drop suddenly and for providing a transient condition signal when a load change condition is determined;

(f) means for controlling the inverter to rapidly increase the RMS voltage level of the output voltage waveform to a high RMS voltage level in response to the transient condition signal; and (g) means for controlling the inverter to gradually decrease the RMS voltage level of the output voltage waveform from the high RMS voltage level down to the desired steady state RMS voltage level following the response to the transient condition signal.

22. The backup power system of claim 21 comprising additionally means for disconnecting the AC power system from the load in response to the line fault detection signal.

23. The backup power system of claim 21 wherein the transient condition detection means includes means for monitoring the output voltage waveform and means for providing the transient condition signal when the voltage level of the output voltage waveform drops by more than a selected amount.

24. The backup power system of claim 21 wherein the transient condition detection means includes means for monitoring an output current of the inverter and means for providing the transient condition signal when the level of the output current of the inverter increases by more than a selected amount.

25. The backup power system of claim 21 wherein the means for controlling the inverter to rapidly increase the RMS voltage level of the output voltage waveform in response to the transient condition signal includes means, for rapidly increasing the RMS voltage level of the output voltage waveform to approximately the maximum RMS output voltage level of the inverter.

26. A back up power system for providing power to a power factor corrected load from an AC power system under normal operating conditions and for providing power to the load from an inverter when the AC power system fails, comprising:

(a) an inverter capable of being controlled to provide a stepped square wave output voltage waveform having an output voltage waveform duty cycle;

(b) line fault detection means for determining the occurrence of a failure of the AC power system and for providing a line fault detection signal;

(c) means for providing an output voltage waveform having approximately a maximum output voltage waveform duty cycle in response to the line fault detection signal, thereby providing power to the load at approximately a maximum RMS voltage level when the AC power system fails;

(d) means for gradually reducing the output voltage waveform duty cycle from the approximately maximum output voltage waveform duty cycle down to a shorter output voltage waveform duty cycle to thereby provide a desired steady state RMS voltage level to the load following the response to the line fault detection signal;

(e) means for regulating the output voltage waveform duty cycle to provide the desired steady state RMS voltage level to the load;

(f) transient condition detection means for determining the occurrence of a transient load change condition that causes the RMS voltage level of the output voltage waveform to drop suddenly and for providing a transient condition signal when a load change condition is determined;

(g) means for rapidly increasing the output voltage waveform duty cycle to a long duty cycle in response to the transient condition signal; and (h) means for gradually reducing the output voltage waveform duty cycle from the long duty cycle down to a shorter duty cycle to provide the desired steady state RMS voltage level to the load following the response to the transient condition signal.

27. The backup power system of claim 26 comprising additionally means for disconnecting the AC power system from the load in response to the line fault detection signal.

28. The backup power system of claim 26 wherein the transient condition detection means includes means for monitoring the output voltage waveform and means for providing the transient condition signal when the voltage level of the output voltage waveform drops by more than a selected amount.

29. The backup power system of claim 26 wherein the transient condition detection means includes means for monitoring an output current of the inverter and means for providing the transient condition signal when the level of the output current of the inverter increases by more than a selected amount.

30. The backup power system of claim 26 wherein the means for rapidly increasing the output voltage waveform duty cycle in response to the transient condition signal includes means for rapidly increasing the output voltage waveform duty cycle to approximately the maximum output voltage waveform duty cycle.

31. The backup power system of claim 26 wherein the means for rapidly increasing the output voltage waveform duty cycle in response to the transient condition signal includes means for increasing the output voltage waveform duty cycle to a long duty cycle within a time period of one cycle of the output voltage waveform from the determination of the occurrence of the transient condition.

32. The backup power system of claim 26 wherein the means for providing an output voltage waveform having approximately the maximum output voltage waveform duty cycle in response to the line fault detection signal includes means for providing an output voltage waveform having an output voltage waveform duty cycle of at least approximately $7/8$ of the maximum output voltage waveform duty cycle.

33. The backup power system of claim 26 wherein the means for gradually reducing the output voltage waveform duty cycle following the response to the line fault detection signal and the means for gradually reducing the output voltage waveform duty cycle following the response to the transient condition signal include means for reducing the output voltage waveform duty cycle at a rate of no more than approximately $1/64$ of the maximum output voltage waveform duty cycle for each cycle of the output voltage waveform.

34. The backup power system of claim 26 wherein the transient condition detection means includes means for providing the transient condition signal when a change in the output voltage waveform duty cycle of equal to or greater than a selected threshold change amount is required in any one cycle of the output voltage waveform in order to maintain the desired steady state RMS voltage level.

35. The backup power system of claim 34 wherein the selected threshold change amount is approximately $4/64$ of the maximum inverter duty cycle.

\* \* \* \* \*